US008649650B2

(12) United States Patent
Sen et al.

(10) Patent No.: US 8,649,650 B2
(45) Date of Patent: Feb. 11, 2014

(54) METHOD FOR FABRICATING RARE EARTH (RE) DOPED OPTICAL FIBER USING A NEW CODOPANT

(75) Inventors: Ranjan Sen, Kolkata (IN); Anirban Dhar, Kolkata (IN); Mukul Chandra Paul, Kolkata (IN); Himadri Sekhar Maiti, Kolkata (IN)

(73) Assignees: Council of Scientific & Industrial Research, New Delhi (IN); Department of Information Technology, New Delhi (IN)

( * ) Notice: Subject to any disclaimer, the term of this patent is extended or adjusted under 35 U.S.C. 154(b) by 99 days.

(21) Appl. No.: 13/260,415

(22) PCT Filed: Mar. 29, 2010

(86) PCT No.: PCT/IN2010/000201
§ 371 (c)(1),
(2), (4) Date: Apr. 25, 2012

(87) PCT Pub. No.: WO2010/109494
PCT Pub. Date: Sep. 30, 2010

(65) Prior Publication Data
US 2012/0201504 A1    Aug. 9, 2012

(30) Foreign Application Priority Data
Mar. 27, 2009  (IN) .............................. 609/DEL/2009

(51) Int. Cl.
*G02B 6/00*   (2006.01)
*C03B 37/075*   (2006.01)
*C03C 13/00*   (2006.01)

(52) U.S. Cl.
USPC .................. 385/141; 65/390; 65/397; 65/398

(58) Field of Classification Search
USPC ............................................ 385/141; 65/390
See application file for complete search history.

(56) References Cited

U.S. PATENT DOCUMENTS 5,284,500 A * 2/1994 Okamura et al. ............... 65/378
5,474,588 A * 12/1995 Tanaka et al. .................. 65/390
5,526,459 A * 6/1996 Tanaka et al. ................. 385/142

(Continued)

OTHER PUBLICATIONS

Taylor, Elizabeth R. et. al. "Fabrication and Optical Characterization of Doped Germanosilicate Fibres." Jan. 1, 1994, Materials Research Society Symposium Proceedings, Materials Research Society, USA, pp. 185-190.*

*Primary Examiner* — Rhonda Peace
(74) *Attorney, Agent, or Firm* — Ladas & Parry LLP

(57) ABSTRACT

The present invention provides a method of making rare earth (RE) doped optical fiber using BaO as co-dopant instead of Al or P commonly used for incorporation of the RE in silica glass by MCVD and solution doping technique. The method comprises deposition of particulate layer of $GeO_2$ doped $SiO_2$ with or without small $P_2O_5$ for formation of the core and solution doping by soaking the porous soot layer into an aqueous solution of RE and Ba containing salt. This is followed by dehydration and sintering of the soaked deposit, collapsing at a high temperature to produce the preform and drawing of fibers of appropriate dimension. The use of Ba-oxide enables to eliminate unwanted core-clad interface defect which is common in case of Al doped fibers. The fibers also show good RE uniformity, relatively low optical loss in the 0.6-1.6 μm wavelength region and good optical properties suitable for their application in amplifiers, fiber lasers and sensor devices.

18 Claims, 1 Drawing Sheet represents imperfect core-clad boundary obtained using Al as copdopant via conventional method.

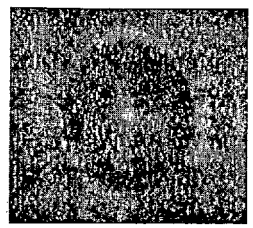

Imperfect core-clad interface obtained by using Al as codopant using conventional method

(56) References Cited

U.S. PATENT DOCUMENTS

| | | | |
|---|---|---|---|
| 6,751,990 B2* | 6/2004 | Bandyopadhyay et al. | 65/378 |
| 6,851,281 B2* | 2/2005 | Sen et al. | 65/390 |
| 7,116,472 B2* | 10/2006 | Andrejco et al. | 359/341.5 |
| 7,292,766 B2* | 11/2007 | Anderson et al. | 385/142 |
| 2002/0124601 A1* | 9/2002 | Bandyopadhyay et al. | 65/390 |
| 2003/0152115 A1* | 8/2003 | Jiang et al. | 372/6 |
| 2009/0010286 A1* | 1/2009 | Messaddeq et al. | 372/6 |
| 2012/0201504 A1* | 8/2012 | Sen et al. | 385/141 |

\* cited by examiner

Figure 1 represents imperfect core-clad boundary obtained using Al as copdopant via conventional method.

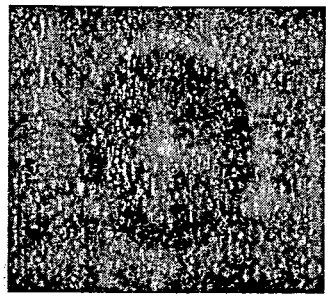

Figure 1: Imperfect core-clad interface obtained by using Al as codopant using conventional method Figure 2 represent improved core-clad interface using Ba as codopant.

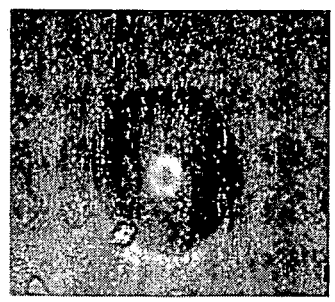

Figure 2: Improved core-clad interface obtained by using BaO as codopant using proposed method

METHOD FOR FABRICATING RARE EARTH (RE) DOPED OPTICAL FIBER USING A NEW CODOPANT

FIELD OF THE INVENTION

The present invention relates to an improved method for fabricating rare earth (RE) doped optical fiber using a new codopant.

BACKGROUND OF THE INVENTION

Rare-earth (RE) doped optical fibers have found promising applications in the field of optical amplifiers, fiber lasers and sensors. The RE elements doped into the core of such fibers act as the active medium. Different REs like Er, Nd, Yb, Sm, Ho and Tm can be doped to get lasing and amplification covering a wide range of wavelengths. Er doped fiber amplifier (EDFA) due to its high quantum efficiency and broad gain bandwidth shows tremendous application in communication field meeting up the huge bandwidth requirement in internet services and information technology. RE-doped fiber lasers are replacing gas based or solid state lasers in most of the applications due to their compactness, excellent beam quality and easy handling capability. As a result, there has been a tremendous growth in the market with the overall sales predicted to touch $2.8 billion industrial laser market by 2010. Fiber laser devices are suitable for a variety of applications viz. material processing (cutting, grinding and engraving), range finding, medical and military applications. Thus fabrication of RE doped fibers with varied designs, compositions and appropriate RE concentration attracts a lot of research interest. The improvement in the properties of the fibers and increase in the process reproducibility remain the prime objective.

Reference may be made to Townsend J. E., Poole S. B., and Payne D. N., Electronics Letters, Vol. 23 (1987) p-329, "Solution-doping technique for fabrication of rare-earth-doped optical fiber" wherein, the Microwave Chemical Vapour Deposition (MCVD) process is used to fabricate the preform with a step index profile with desired core-clad structure, while solution doping is adopted for incorporation of the active ion. In the first step $P_2O_5$ and F doped cladding layer with desired thickness is deposited within a high silica glass substrate tube to produce matched clad or depressed clad type structure followed by deposition of core layers of predetermined composition containing index-raising dopant like $GeO_2$ at a lower temperature to form unsintered porous soot. Deposited soot layer is then immersed into an aqueous solution of the dopant precursor (typical concentration 0.1 M) up to 1 hour. Any soluble form of the dopant ion is suitable for preparation of the solution, although rare earth halides have been mostly used. After dipping, the tube is rinsed with acetone and remounted on lathe. The core layer containing the RE is then dehydrated and sintered to produce a clear glassy layer. Dehydration is carried out at a temperature of 600° C. by using chlorine. The level of OH⁻ is reduced below 1 ppm using $Cl_2/O_2$ ratio of 5:2 provided the drying time exceeds 30 min. Finally the tube is collapsed in the usual manner to get a solid glass rod called preform from which fiber is drawn using conventional method.

Reference may be made to DiGiovanni D. J., SPIE Vol. 1373 (1990) p-2 "Fabrication of rare-earth doped optical fiber" wherein, the substrate tube with the porous core layer is soaked in an aqueous or alcoholic solution containing a nitrate or chloride of the desired RE ion along with co-dopant Al salts. The tube is drained, dried and remounted on lathe. The dehydration is carried out by flowing dry chlorine through the tube at about 900° C. for an hour. After dehydration, the layer is sintered and the tube is collapsed to be drawn to fiber.

Reference may be made to Ainslie B. J., Craig S. P., and Wakefield B., Material Letters, Vol. 6, (1988) p-139, "The fabrication, assessment and optical properties of high-concentration $Nd^{3+}$ and $Er^{3+}$ doped silica based fibers" wherein to increase the rare earth solubility $Al_2O_3$—$P_2O_5$—$SiO_2$ host glass was selected and high concentration of $Nd^{3+}$ and $Er^{3+}$ have been introduced using solution doping method and quantified. Following the deposition of cladding layers $P_2O_5$ doped silica soot is deposited at lower temperature. The prepared tubes are soaked in an alcoholic solution of 1 M $Al(NO_3)_3$ having various concentration of $ErCl_3$ and $NdCl_3$ for 1 hour. Addition of Al helps to enhance RE concentrations in the core center without clustering effect. It is further disclosed that Al and RE profile lock together in some way, which retards the volatility of RE ion.

Reference may be made to U.S. Pat. No. 7,116,472 (2006), by M. J. Andrejco and B. wang, "Rare-earth-doped optical fiber having core co-doped with fluorine" wherein a silica core region is doped with Al and fluorine (F) along with at least one rare earth element in presence of germanium. The presence of small amounts of F are effective to lower the refractive index, and hence the NA, of the core region even in the presence of significant amounts of Al (e.g., >8 mol %). This provides a fiber with a relatively flat gain spectrum and a low NA (e.g., preferably <0.20).

Reference may be made to U.S. Pat. No. 5,474,588 (1995) by D. Tanaka, A. Wada, T. Sakai, T. Nozawa and R. Yamauchi, 'Solution doping of a silica with erbium, aluminium and phosphorus to form an optical fiber' wherein a manufacturing method for Er doped silica is described in which silica glass soot is deposited using VAD apparatus to form a porous soot preform, dipping the said preform into an ethanol solution containing an erbium compound, an aluminium compound and a phosphoric ester, and desiccating said preform to form Er, Al and P containing soot preform. The segregation of $AlCl_3$ in the preform formation process is suppressed due to the presence of phosphorus and as a result the doping concentration of Al ions can be set to a high level (>3 wt %). It has been also claimed that the dopants concentration and component ratio of Er, Al and P ions having extremely accurate and homogeneous in the radial as well as in longitudinal directions.

Reference may be made to U.S. Pat. No. 5,284,500 (1994) by K. Okamura and T. Arima, "Process for fabricating an optical fiber preform" wherein two constricted portions are formed at a quartz reaction tube and solution of a compound of a rare earth element is charged into the section between the constricted portions for doping which results in an uniform doping along the length of an optical fiber preform with defects being rarely produced. In order to realize a high gain over a wide wavelength band in the optical fiber amplifier using the doped fiber, it is effective to dope aluminium in the core aside from rare earth elements. Solution of an aluminum compound such as anhydrous $AlCl_3$ is mixed with $ErCl_3$ as a rare earth element in alcohols. Anhydrous $AlCl_3$ is preferred in order to omit the dehydration step. The solution can also be used in the form of a mist in a soot-like core glass by which it becomes possible to control the doping concentration in high accuracy. The distribution of the doping concentration along the radial direction of the core can be arbitrarily set by controlling the deposition temperature of soot like core glass.

Reference may be made to U.S. Pat. No. 5,526,459 (1996), by D. Tanaka, A. Wada, T. Sakai, T. Nozawa and R. Yamauchi, "Erbium-doped silica optical fiber preform" wherein a silica glass soot is first deposited on a seed rod to obtain a soot preform in a porous state on the seed rod containing germanium and phosphorous oxide followed by dipping in a solution containing an erbium compound, and an aluminum compound ($AlCl_3$). Subsequent processing provides the ultimate preform. Process helps to attain good dopant concentration and component ratio distribution of erbium ions, aluminum ions, and phosphorus ions which is extremely accurate and homogeneous in the radial and longitudinal directions, overcoming the problems existed in erbium doped optical fibers obtained via conventional methods, that is to say, the low concentration of erbium ions and aluminum ions in the core region, are solved.

Reference may be made to U.S. Pat. No. 6,751,990 (2004), by T. Bandyopadhyay, R. Sen, S. K. Bhadra, K. Dasgupta and M. Ch. Paul, "Process for making rare earth doped optical fiber" wherein unsintered particulate layer consist of $GeO_2$ and $P_2O_5$ and soaked into an alcoholic/aqueous solution of RE-salts containing co-dopants like $AlCl_3/Al(NO_3)_3$ in definite proportion. Porosity of the soot, dipping period, strength of the soaking solution and the proportion of the codopants are controlled to achieve the desired RE ion concentration in the core and to minimize the core clad boundary defects. The RE ion distribution in the resulting fibers matches with the Gaussian distribution of the pump beam to increase the overlapping and pump conversion efficiency.

Reference may be made to U.S. Pat. No. 6,851,281 (2005), by R. Sen, M. Pal, M. C. Paul, S. K. Bhadra, S. Chatterjee and K. Dasgupta. "Method of fabricating rare earth doped optical fibre" wherein MCVD process coupled with solution doping technique is used to deposit porous silica soot layer containing $GeO_2$, $P_2O_5$ or such refractive index modifiers by the backward deposition method for formation of the core. The deposited particulate layer is presintered by backward pass with flow of $GeCl_4$ and/or corresponding dopant halides and is soaked into an alcoholic/aqueous solution of RE-salts containing codopants such as $AlCl_3$ in definite proportion followed by conventional steps to obtain the final preform. The fiber was drawn from preform in a usual method maintaining suitable core-clad dimensions and geometry.

The drawbacks of the above mentioned processes are as follows:
1. Doping of Al for increase in the RE solubility is associated with segregation of $Al_2O_3$ rich phase if Al ion concentration exceeds a minimum level, usually 1-3 wt % depending on fabrication conditions.
2. Increasing RE incorporation by addition of more Al in the soaking solution leads to imperfections at the core-clad boundary.
3. The problems stated under 1 and 2 are more prominent in case of Al doped germano-silicate fibers.
4. Codoping of Phosphorous reduces segregation of Al but enhances base loss of the resulting fibers.
5. The problems discussed under 1 to 3 cause degradation in optical properties of the fibers.

OBJECTS OF THE INVENTION

The main object of the present invention is to provide a new codopant for fabricating rare earth (RE) doped optical fiber which obviates the drawbacks of the hitherto known prior art as detailed above.

Another object of the present invention is to provide a method where the core-clad interface problem associated with high level of Al doping is eliminated.

Yet another object of the present invention is to provide a method where the core-clad defect generation is eliminated without any base loss increase in the fibers.

Still another object of the present invention is to provide a method where the RE concentration uniformity along the preform/fiber length is maintained even for elimination of codopant such as Al used in the known techniques.

Yet another object of the present invention is to provide a method which produces relatively low optical loss in the 0.6-1.6 µm wavelength region.

SUMMARY OF THE INVENTION

Accordingly the present invention provides an improved method for fabricating rare earth (RE) doped optical fiber using a new codopant comprising the following steps:
a) deposition of pure $SiO_2$ or $P_2O_5$—F doped synthetic cladding within a silica glass substrate tube to obtain matched or depressed clad type structure,
b) forming a core by depositing unsintered particulate layer comprising at least one of $GeO_2$ and $P_2O_5$ at a tube surface temperature in the range of 1200-1300° C., the unsintered particulate layer being deposited as a porous soot layer;
c) maintaining $GeO_2$ concentrations between 3.0 and 15.0 mol % in the ultimate core layer;
d) maintaining $P_2O_5$ concentrations between 0.5 and 1.5 mol % in the core, when added with $GeO_2$;
e) soaking the tube containing the porous soot layer into a solution containing RE salt in the concentration range of 0.002 M to 0.3 M with Ba salt in the concentration range 0.15 (M) to 2.0 (M);
f) drying the soaked core layer under dry $N_2$ or any inert gas through the tube for 10 to 30 minutes;
g) heating the tube gradually in presence of $O_2$ and He in the temperature range 700-1100° C. to effect oxidation;
h) dehydrating the core layer at a temperature in the range of 800-1200° C. and in presence of $Cl_2$ and $O_2$;
i) sintering the core layer in presence of a mixture of $O_2$ and He in the temperature range of 1200 to 1850° C.;
j) collapsing the tube at a temperature in the range of 2000-2300° C. to obtain a perform;
k) jacketing the preform with silica tubes of suitable dimensions;
l) drawing fibers from the perform;
the said method being characterized in the use of Barium oxide (BaO) as a codopant to control RE incorporation while fabricating the RE doped optical fiber and provide smooth core clad interface therein.

In an embodiment of the present invention, the unsintered core layer deposition temperature is selected within the range of 1200-1300° C. preferably in the range of 1250-1280° C.

In another embodiment of the present invention, the unsintered particulate layer comprises at least one of $GeO_2$, $P_2O_5$ or other glass forming oxides as refractive index modifiers.

In yet another embodiment of the present invention, the thickness of the porous layer ranges from 3 to 25 µm.

In still another embodiment of the present invention RE salt used is chloride, nitrate or any other salt soluble in solvent used for preparing the solution used in the process.

In yet another embodiment of the present invention the source of Barium Oxide is Barium salt selected from chloride, nitrate or any other salt soluble in a solvent used for preparing the solution used in the process.

In still another embodiment of the present invention solution for Barium and RE salts are prepared using water as solvent or any other solvent capable of dissolving Ba and RE salts.

In still another embodiment of the present invention soaking period is adjusted between 30 and 90 minute, preferably 45 minute.

In still another embodiment of the present invention, the mixture of $O_2$ and He may be in the range of 3:1 to 6:1 during oxidation.

In still another embodiment of the present invention, the ratio of $Cl_2:O_2$ during dehydration ranges from 1.5:1 to 3:1.

In yet another embodiment of the present invention the dehydration period lies between 45 and 90 minute, preferably 60 minute.

In yet another embodiment of the present invention the porous core layer is sintered in presence of $O_2$ and He gas within temperature range of 1200° C. to 1850° C.

In yet another embodiment of the present invention the RE concentration in the fiber core is increased with increasing RE concentration in soaking solution.

In yet another embodiment of the present invention the concentration of RE ion, preferably Er or Yb ion but not limited to it, is controlled by adjusting the porosity of the deposited soot layer.

In yet another embodiment of the present invention, the core-clad interface is defect free even at high co-dopant concentration.

In yet another embodiment of the present invention, the resulting fiber exhibits relatively low optical loss in the 0.6-1.6 μm wavelength region compared to the fibers fabricated by conventional method.

In yet another embodiment of the present invention, the compositions of the core and cladding glass can be adjusted to achieve Numerical Aperture (NA) of 0.15 to 0.25 and $RE^{3+}$ ion concentration in the range of 100 to 2000 ppm in the ultimate fiber.

Still another embodiment of the invention provides a rare earth (RE) doped optical fiber prepared by the said process, comprising $SiO_2$ in the range of 88-90 mol %, $GeO2$ in the range of 9-11 mol %, BaO 0.1-0.9 mol %, and rare earth metals selected from $Er2O3$ and $Yb2O3$ in the range of 0.01-0.06 mol %.

BRIEF DESCRIPTION OF ACCOMPANYING DRAWINGS

FIG. 1 represents imperfect core-clad boundary obtained using Al as copdopant via conventional method.

FIG. 2 represent improved core-clad interface using Ba as codopant, in accordance with an embodiment of the present invention.

DETAILED DESCRIPTION OF THE INVENTION

The novelty of the present invention lies in obtaining optical fibers doped with various concentrations of RE in the preform/fiber core without formation of defect centers which degrades the optical properties of the fibers. The Inventive step lies in identification of a new codopant Ba instead of commonly used codopant like Al or Phosphorous. The incorporation of Ba-oxide helps to eliminate unwanted core-clad interface problem and achieve relatively low optical loss in the 0.6-1.6 μm wavelength region thereby improving the reproducibility of the process in producing fibers with desired optical properties.

Usually, Al or P is used as codopant to increase the RE solubility in silica glasses since the large RE ions cannot be accommodated within the rigid network structure of silica due to absence of sufficient non-bridging oxygen. Proper selection of RE/codopant is thus required to avoid RE clustering, which degrades the fiber performance because of energy transfer within the RE ions. The appearance of core-clad interface problem at high Al content is a major limitation which leads to poor light guiding characteristics. This is said to arise due to viscosity mismatch of core and clad materials. The problem is more prominent for Al-doped germano-silicate fibers due to thermal expansion mismatch between core and clad glass compositions. In the present invention, we propose the use of Ba as an alternate codopant which does not have any undesirable absorption or emission peak in silica operating wavelength region and in addition provides, smooth core-clad interface. Moreover, incorporation of Ba changes the refractive Index (RI) difference of core layer appreciably (more than Al) compared to cladding glass and provides the advantage of adjusting the Numerical Aperture (NA). In an embodiment of the present invention, the composition of the core and cladding glass are controlled in a manner to achieve NA between 0.15 and 0.25. The modification provides good control over RE incorporation and uniformity along the preform/fiber length comparable to the known techniques.

The chemistry behind this can be explained as follows. Since BaO is a typical network modifier, when added in silica glass it helps to open up the Si—O tetrahedron structure by breaking silicon-oxygen bonds and thereby increasing the number of non-bridging oxygen. The enhancement in non-bridging oxygen provides required charge compensation and coordination to rare earth ions and thereby reduces clustering probability and leads to smooth collapsing resulting in defect free core-clad boundary.

The present invention is illustrated in FIGS. 1 to 2 of the drawings accompanying this specification.

The different steps of the process are as follows:

i) The process starts with deposition of pure $SiO_2$ or $P_2O_5$—F doped sintered layers inside a silica tube to make matched or depressed clad type geometry at a temperature of 1800-2000° C. using MCVD technique.

ii) In next step, an unsintered particulate layer containing Ge or P is deposited at a temperature between 1200 and 1300° C. The unsintered particulate layer may comprise at least one of $GeO_2$, $P_2O_5$ or any other glass forming oxides as refractive index modifiers. The $GeO_2$ concentration may vary from 3.0 to 15.0 mole % and $P_2O_5$ concentration from 0.5 to 3.0 mole % when added with $GeO_2$. The unsintered particulate layer may be deposited as a porous soot layer. The thickness of the soot deposit ranges from 3 to 25 μm.

iii) The particulate layer is soaked with an alcoholic or aqueous solution containing RE salt in the concentration range of 0.00 2 M to 0.3 M and Ba-salt in the concentration range of 0.15 (M) to 2.0 (M). The soaking time employed is 30 minute to 90 minute but preferably at 45 minute. The RE concentration in the fiber core is increased with increase in RE concentration in soaking solution. Further, the concentration of RE ion, preferably Er or Yb ion but not limited to it, is controlled by adjusting the porosity of the deposited porous soot layer. In an embodiment of the present invention, the $RE^{3+}$ ion concentration is maintained in the range of 100 to 2000 ppm in the ultimate fiber.

iv) The RE and Ba salt is selected from chloride, nitrate or any other salt soluble in solvent used for preparing the solution used in the process.

v) During preparation of the solution, the Ba salt and RE salt are dissolved in water as solvent. The solution may also be prepared with any other solvent capable of dissolving Ba and RE salts.

vi) The soaked layer is dried with flow of dry nitrogen or an inert gas through the tube for 10-30 minute.

vii) This is followed by heating in presence of $O_2$ and He at a temperature range of 700-1100° C. for oxidation of the RE and Ba salts. The mixture of $O_2$ and He may be in the range of 3:1 to 6:1 during oxidation.

viii) Dehydration of core layer is carried out at a temperature range of 800-1200° C., in presence of $Cl_2$ and $O_2$ where ratio of $Cl_2$:$O_2$ ranges from 1.5:1 to 3:1.

ix) The dehydration period lies between 45 minute and 90 minute.

x) Sintering of the core layer is performed in presence of $O_2$ and He gas within temperature range of 1200° C. to 1850° C.

xi) After complete sintering, the tube is collapsed at a temperature between 2000 and 2300° C. to obtain the preform.

xii) Jacketing of the preform with silica tubes of suitable dimensions is performed to match the core-clad dimensional ratio.

xiii) Finally fibers are drawn from the fabricated preform.

The inventive step lies in introducing Ba salt as a new codopant to control the RE incorporation in fabrication of the RE doped optical fiber and provide smooth core-clad interface [FIG. 2]. Particularly, the inventive step resides in the use of Barium Oxide (BaO) generated from Barium salt in situ as a codopant. In the present invention, the core-clad interface is defect free even at high co-dopant concentration. In the known methods, Al or P is added to increase the RE solubility in the fiber core since the large RE ions cannot be accommodated within the rigid network of silica due to absence of sufficient non-bridging oxygen. The main advantage of introducing Ba as co-dopant is elimination of unwanted defect generation in the form of star-like patterns along the core-clad interface, which are very common in case of high Al-doped fibers, especially Al doped germano-silicate fibers. The defect formation is associated with scattering and degradation in optical properties of the fibers.

In an embodiment of the present invention a rare earth (RE) doped optical fiber is prepared by implementing the method as defined. The optical fiber comprises $SiO_2$ in the range of 88-90 mol %, $GeO_2$ in the range of 9-11 mol %, BaO 0.1-0.9 mol %, and rare earth metals selected from $Er_2O_3$ and $Yb_2O_3$ in the range of 0.01-0.06 mol %. The optical fiber is suitable for developing fiber lasers, amplifiers and sensors for different purposes and other devices where such fiber is used.

The following examples are given by way of illustration of the working of the invention in actual practice and therefore should not be construed to limit the scope of the present invention in any way.

EXAMPLE-1

Deposition of F-doped matched/depressed cladding layer within a silica tube by MCVD method at a temperature of 1850° C.

Unsintered core deposition in the silica tube at a temperature of 1300° C. The carrier gas flows through the reagent liquids were adjusted to obtain a composition of $SiO_2$=86.2 mol % and $GeO_2$=13.8 mol % in the core layer.

Deposited layer is soaked with a solution containing 0.01 (M) $ErCl_3$ and 0.3 (M) $BaCl_2$, $2H_2O$ for 1 hour and draining out the solution slowly.

Drying of the soaked layer with a flow of nitrogen gas through the tube for 10 min.

Oxidation at temperatures of 790° C., 880° C. and 950° C. maintaining a constant He/$O_2$ ratio of 1:5.

Dehydration was carried out at a temperature of 1010° C. with a $Cl_2$:$O_2$ ratio of 2.5:1 for a period of 1 hour.

The sintering temperature was increased in 4 steps from 1200° C. up to 1850° C. in presence of $GeCl_4$ flow to facilitate sintering. The tube was further heated to increase the temperature stepwise to 1950° C. for complete sintering of the Er & Ba containing porous soot layer. During sintering $O_2$ and He flow was in the ratio of 4.5:1.

The collapsing was done in 3 steps in the usual manner.

Overcladding was done to reduce the core:clad ratio to 3.4:125. The NA measured in the fiber was 0.22·±·0.01.

Composition from Electron Probe Micro Analysis (EPMA): SiO2 88.86 mol %, GeO2 10.96 mol %, BaO 0.168 mol %, Er2O3 0.012 mol %.

EXAMPLE-2

Deposition of F-doped cladding layer within a silica tube by MCVD process at a temperature of 1860° C.

Unsintered core deposition in the silica tube at a temperature of 1250° C. The carrier gas flows through the reagent liquids were adjusted to obtain a composition of $SiO_2$=87.2 mol % and $GeO_2$=12.8 mol % in the core layer.

Dipping the tube with the deposited layer in an aqueous solution containing 0.01 (M) $ErCl_3$ and 1.0 (M) $BaCl_2$, $2H_2O$ for 1 hour and draining out the solution slowly.

Drying by maintaining nitrogen gas flow through the tube for 35 min.

Oxidation at temperatures of 790° C., 860° C. and 990° C. maintaining a constant He/$O_2$ ratio of 1:5.

Dehydration was carried out at a temperature of 1010° C. with a $Cl_2$:$O_2$ ratio of 2.5:1 for a period of 1 hour.

The sintering temperature was increased in 4 steps up to from 1200 to 1900° C. in presence of $GeCl_4$ gas flow. The tube was further heated to increase the temperature stepwise to 2020° C. for complete sintering of the Er & Ba containing porous soot layer. During sintering $O_2$ and He flow was in the ratio of 5:1.

The collapsing was done in 3 steps in the usual manner.

Overcladding was done to reduce the core:clad ratio to 4.1:125. The NA measured in the fiber was 0.20·±0.01.

Composition from EPMA: SiO2 89.58 mol %, GeO2 9.5 mol %, BaO 0.905 mol %, Er2O3 0.015 mol %.

EXAMPLE-3

Deposition of F-doped cladding within a silica tube by MCVD process at a temperature of 1850° C.

Unsintered core deposition in the silica tube at a temperature of 1250° C. The carrier gas flows through the reagent liquids were adjusted to obtain a composition of $SiO_2$=86.2 mol % and $GeO_2$=13.8 mol % in the core.

Dipping the tube with the deposited layer in a solution containing 0.3 (M) $YbCl_3$ and 1.0 (M) $BaCl_2$, $2H_2O$ for 1 hour and draining out the solution slowly.

Drying by maintaining nitrogen gas flow through the tube for 30 min.

Oxidation at temperatures of 760° C., 850° C. and 950° C. maintaining a constant He/$O_2$ ratio of 1:5.

Dehydration was carried out at a temperature of 1010° C. with a $Cl_2$:$O_2$ ratio of 2.5:1 for a period of 1 hour.

The sintering temperature was increased in 4 steps up to 1850° C. in presence of $GeCl_4$ flow. The tube was further heated to increase the temperature stepwise to 1960° C. for complete sintering of the deposited soot layer soaked with Ba and Yb salts in presence of $O_2$ and He whose flow was in the ratio of 5:1.

The collapsing was done in 3 steps.
Overcladding was done to reduce the core:clad ratio to 4.5:125. The NA measured in the fiber was 0.20·±0.01.
Composition from EPMA: $SiO_2$ 88.7 mol %, $GeO_2$ 10.319 mol %, BaO 0.93 mol %, $Yb_2O_3$ 0.051 mol %.

ADVANTAGES OF THE INVENTION

The main advantages of the present invention are:
1. Ba acts as an alternate co-dopant and different RE ions are incorporated with varying concentration without any problem.
2. The use of Al or P selected as codopants in the known techniques is avoided.
3. The process provides smooth core-clad boundary, without generation of star-like defects which appear on use of Al-oxide as a codopant in silica.
4. The defect at core-clad interface is also eliminated for Al-doped germano-silicate core fibers where the defect generation takes place even for lower concentration of Al-oxide.

We claim:
1. An improved method for fabricating rare earth (RE) doped optical fiber using a new codopant, comprising the following steps:
  a. deposition of pure $SiO_2$ or $P_2O_5$—F doped synthetic cladding within a silica glass substrate tube to obtain matched or depressed clad type structure,
  b. forming a core by depositing unsintered particulate layer comprising at least one of $GeO_2$ and $P_2O_5$ at a surface of the tube at a temperature in the range of 1200-1300° C., the unsintered particulate layer being deposited as a porous soot layer;
  c. maintaining $GeO_2$ concentrations between 3.0 and 15.0 mol % in the core layer;
  d. maintaining $P_2O_5$ concentrations between 0.5 and 1.5 mol % in the core, when added with $GeO_2$;
  e. soaking the tube containing the porous soot layer into a solution containing RE salt in the concentration range of 0.002 M to 0.3 M with Barium (Ba) salt in the concentration range 0.15 (M) to 2.0 (M);
  f. drying the soaked core layer under dry $N_2$ or any inert gas through the tube for 10 to 30 minutes;
  g. heating the tube gradually in presence of $O_2$ and He in the temperature range 700-1100° C. to effect oxidation;
  h. dehydrating the core layer at a temperature in the range of 800-1200° C. and in presence of $Cl_2$ and $O_2$;
  i. sintering the core layer in presence of a mixture of $O_2$ and He in the temperature range of 1200 to 1850° C.;
  j. collapsing the tube at a temperature in the range of 2000-2300° C. to obtain a preform;
  k. jacketing the preform with silica tubes of suitable dimensions;
  l. drawing fibers from the preform;
  said method being characterized in the use of Barium Oxide (BaO) as a codopant to control RE incorporation while fabricating the RE doped optical fiber and provide smooth core clad interface therein.

2. A method as claimed in claim 1, wherein the unsintered core layer deposition temperature is preferably in the range of 1250-1280° C.

3. A method as claimed in claim 1, wherein the unsintered particulate layer comprises at least one of the glass forming oxides selected from the group consisting of $GeO_2$ and $P_2O_5$ as refractive index modifiers.

4. A method as claimed in claim 1, wherein the porous soot layer thickness ranges from 3 to 25 µm.

5. A method as claimed in claim 1, wherein the RE salt is a salt soluble in a solvent used for preparing the solution used in the process, the said salt being selected from the group consisting of chloride and nitrate.

6. A method as claimed in claim 1, wherein the source of Barium Oxide is the Barium salt selected from chloride, nitrate or any other salt soluble in a solvent used for preparing the solution used in the process.

7. A method as claimed in claim 1, wherein the solution is prepared from a solvent selected from water or any other solvent capable of dissolving Ba and RE-salts.

8. A method as claimed in claim 1, wherein the soaking time employed is 30 minute to 90 minute but preferably at 45 minute.

9. A method as claimed in claim 1, wherein the mixture of $O_2$ and He may be in the range of 3:1 to 6:1 during oxidation.

10. A method as claimed in claim 1, wherein the ratio of $Cl_2:O_2$ during dehydration ranges from 1.5:1 to 3:1.

11. A method as claimed in claim 1, wherein the dehydration period lies between 45 min to 1.5 hour.

12. A method as claimed in claim 1, wherein sintering takes place in presence of $O_2$ & He at a temperature range of 1200° C. to 1850° C.

13. A method as claimed in claim 1, wherein the core-clad interface is defect free even at high co-dopant concentration.

14. A method as claimed in claim 1, wherein the resulting fiber exhibits optical loss in the 0.6-1.6 µm wavelength region thereby improving the reproducibility of the process in producing fibers with desired optical properties.

15. A method as claimed in claim 1, wherein the compositions of the core and cladding glass are suitable to achieve Numerical Aperture (NA) between 0.15 and 0.25.

16. A method as claimed in claim 1, wherein the $RE^{3+}$ ion concentration is maintained in the range of 100 to 2000 ppm in the ultimate fiber.

17. A rare earth (RE) doped optical fiber prepared by the method of claim 1, comprising $SiO_2$ in the range of 88-90 mol %, $GeO_2$ in the range of 9-11 mol %, BaO 0.1-0.9 mol %, and rare earth metals selected from $Er_2O_3$ and $Yb_2O_3$ in the range of 0.01-0.06 mol %.

18. A RE doped optical fiber as claimed in claim 17, wherein the optical fiber is suitable for developing fiber lasers, amplifiers and sensors for different purposes and other devices where such fiber is used.

* * * * *